US008787902B2

(12) United States Patent  
Kim

(10) Patent No.: US 8,787,902 B2  
(45) Date of Patent: Jul. 22, 2014

(54) METHOD FOR MOBILE-KEY SERVICE

(71) Applicant: Irevo, Inc., Seoul (KR)

(72) Inventor: Seok Hwan Kim, Suwon-si (KR)

(73) Assignee: Irevo, Inc., Seoul (KP)

( * ) Notice: Subject to any disclaimer, the term of this patent is extended or adjusted under 35 U.S.C. 154(b) by 0 days.

(21) Appl. No.: 13/665,083

(22) Filed: Oct. 31, 2012

(65) Prior Publication Data

US 2014/0120905 A1 May 1, 2014

(51) Int. Cl.
*H04W 88/02* (2009.01)
*H04W 4/00* (2009.01)
(52) U.S. Cl.
CPC ..................................... *H04W 4/008* (2013.01)
USPC ..................................................... 455/426.1

(58) Field of Classification Search
USPC ........... 455/426.1, 41.2, 411, 414.1; 370/228; 726/1, 3, 6, 7; 340/5.61
See application file for complete search history.

(56) References Cited

U.S. PATENT DOCUMENTS

2011/0165896 A1* 7/2011 Stromberg et al. ........... 455/466
2011/0202466 A1* 8/2011 Carter ............................. 705/67
2013/0200999 A1* 8/2013 Spodak et al. ............... 340/5.65

* cited by examiner

*Primary Examiner* — Diane Mizrahi
(74) *Attorney, Agent, or Firm* — Nixon & Vanderhye P.C.

(57) ABSTRACT

Disclosed is a method for mobile-key service, in which user authentication is performed through NFC between an SE and a door lock. Herein, a mobile phone periodically checks a call service areas of a mobile radio communication network, and the mobile phone enables the NFC function based on a result of the call service area checking operation, and if the mobile phone approaches the door lock, the mobile-key is transmitted to the door lock through the NFC function, and thus the user authentication can be performed.

19 Claims, 7 Drawing Sheets

METHOD FOR MOBILE-KEY SERVICE

TECHNICAL FIELD

The present invention relates to a method for mobile-key service, and more particularly, to a method for providing the mobile-key service through a server and a mobile phone. The mobile phone is equipped with an SE (Secured Element) that is capable of being connected with a digital door lock by near field communication.

BACKGROUND ART

Recently, a mobile phone such as a smart phone is equipped with an SE such as a USIM (Universal Subscriber Identify Module) card and Micro SD (Secure Digital) card, the SE can securely store information, and the mobile phone also has a communication function with the SE. Further, the mobile phone has an RFID (Radio Frequency Identification) communication function as an NFC (Near Field Communication) function.

By using the NFC function and the SE, the mobile phone may be used as a transportation card, etc. Furthermore, since several banks and public offices support financial services by using the NFC function, the mobile phone may be also used as an electronic payment means.

In addition, the mobile phone having the NFC function may be used an authentication means for opening a digital door lock by transmitting a mobile-key stored in the SE to the digital door lock through the NFC function.

DISCLOSURE

Technical Problem

An object of the present invention is to provide a method for mobile-key service, which allows a mobile phone having an SE and an NFC function to be used as an authentication means of a digital door lock such that a user can conveniently use the digital door lock.

Another object of the present invention is to provide a method for mobile-key service, which can support various services required in using the digital door lock with the mobile phone.

Yet another object of the present invention is to provide a method for mobile-key service, which can prevent the SE from being used by an unjust user.

Technical Solution

To achieve the object of the present invention, the present invention provides a method for mobile-key service using a mobile phone having a NFC function and equipped with SE storing a mobile-key, a door lock which performs user authentication based on the mobile-key transmitted through the NFC function, and a server which communicated with the mobile phone through a mobile radio communication network, comprising: periodically checking whether the mobile phone can communicate with the server through the mobile radio communication network so that the mobile phone is within a call service area; enabling the NFC function of the mobile phone when the mobile phone is within the call service area; transmitting the mobile-key from the SE to the door lock through the NFC function when the mobile phone approaches the door lock; and receiving the mobile-key in the door lock and locking or unlocking a door according to a result of the user authentication using the mobile-key.

Further, the mobile-key is encrypted by a secret key generated by the door lock.

The method according to the present invention further comprises a process of registering the mobile phone as a member of the mobile-key service, the server transmits a security program to the mobile phone, the mobile phone runs the security program so as to be synchronized with the server, the server generates a unique Endpoint ID and transmits the Endpoint ID to the mobile phone, and the mobile phone simultaneously stores the transmitted Endpoint ID in a storing means of the mobile phone and the SE.

The enabling step of the NFC function of the mobile phone further comprises: comparing the Endpoint ID stored in the storing means and the Endpoint ID stored in the SE by the mobile phone; and disabling the NFC function by the mobile phone when the Endpoint IDs are different from each other.

The method according to the present invention further comprises a process of registering a master phone, in which the door lock and the mobile phone run menus for initially registering each other, and if the mobile phone approaches the door lock, the door lock generates a secret key and transmits the generated secret key and a door lock ID to the SE of the mobile phone, and the mobile phone transmits the secret key and the door lock ID to the server, and the server stores the secret key and the door lock ID.

The server allows only one master phone to be registered with respect to one door lock, and allows one mobile phone to be registered as the master phone with respect to multiple door locks.

The method according to the present invention further comprises a process of providing a mobile-key, in which the master phone transmits to the server a phone number of an object mobile phone to be authenticated in the door lock, the server generates the mobile-key and transmits the mobile-key to the object mobile phone, and the object mobile phone stores the mobile-key in the SE.

The mobile-keys of the master phone and the object mobile phone are encrypted by the same secret key.

The method according to the present invention further comprises a process of deleting the mobile-key, in which the master phone transmits to the server a command of deleting the mobile-key and a phone number of the object mobile phone of which the mobile-key will be deleted, the server instructs the object mobile phone to delete the mobile-key, the object mobile phone deletes the mobile-key stored in the SE and then report completion of the deleting to the server, and the server informs the master phone about the completion of the deleting.

Further, in case that the server does not receive a completion notice of the deleting from the object mobile phone, the deleting command is postponed, and when the object mobile phone connects with the server through the mobile radio communication network, the server retransmits the deleting command to the object mobile phone.

Further, in the checking step of whether the mobile phone is within the call service areas, if it is determined that the mobile phone is out of the call service area, the mobile phone blocks the NFC function.

In the enabling step of the NFC function of the mobile phone, the mobile phone checks whether the mobile-key stored in the SE has a limitation in its available period of time, and if the available period of time is preset, the mobile phone connects with the server periodically and asks present time, and if the present time is within the preset available period of time, it is determined that the mobile-key is valid, and otherwise the mobile-key is deleted.

The method according to the present invention further comprises storing the number of usable times of the mobile-key in the SE when the user authentication is performed, wherein, in the enabling of the NFC function of the mobile phone, the mobile phone checks whether the number of usable times of the mobile-key is preset, and if the number of usable times of the mobile-key is preset, the mobile phone requests the number of usable times stored in the SE, and if the number of usable times is less than the number of usable times, it is determined that the mobile-key is valid, and otherwise the mobile-key is deleted.

The method according to the present invention further comprises storing the number of usable times of the mobile-key in the SE when the user authentication is performed, wherein, in case of limiting a mobile phone to be used only once in performing the user authentication with respect to the door lock, the master phone transmits a phone number of the mobile phone to the server, the server generates a mobile-key of which the number of usable times is preset to 1 and then transmits the mobile-key to the mobile phone, the mobile phone stores the mobile-key in the SE, and when the mobile phone approaches the door lock, the SE of the mobile phone transmits the mobile-key to the door lock so as to perform the user authentication, and then since the number of usable times becomes 0, the mobile-key is immediately deleted.

Further, the door lock comprises a counter of indicating the number of usable times of a one-time password if the one-time password which is input manually and can used only once is input to the door lock; and in order to provide the one-time password, the master phone transmits to the server a phone number of a object mobile phone to which the one-time password is issued, and the server comprises a counter for indicating issuing order of the one-time password, generates the one-time password and transmits it to the object mobile phone in the form of an SMS message, and if a user inputs the one-time password from the SMS to the door lock, the door lock performs the user authentication only when a counter value included in the one-time password is larger than a stored counter value.

The method according to the present invention further comprises providing an OTP (One Time Password) program relating to the server to the mobile phone; installing the OTP program in the mobile phone and then synchronizing the OTP program with the server; and performing authentication using the OTP program when the mobile phone connects with the server.

The method according to the present invention further comprises a smart guide process in which the door lock transmits information indicating a state of the door lock to the SE of the mobile phone when the user authentication is succeeded, the SE stores the state information, and the mobile phone periodically performs polling of the SE so as to read the stored state information and then displays the state information.

The method according to the present invention further comprises storing whether the user authentication with respect to the door lock is succeeded in the SE; and checking whether the user authentication is succeeded by periodically polling the SE, and informing whether the user authentication is succeeded in the form of an SMS (Short Message Service) message.

The method according to the present invention further comprises storing in the door lock with time at least a part of information included in the mobile-key, if the user authentication is succeeded; controlling the SE to request transmission of the stored information from the door lock; requesting the information stored in the door lock by the SE; and obtaining the stored information from the door lock to the SE.

The server stores a history of issuing the mobile-key, and the master phone runs a mobile-key issuing menu so as to request the stored issuing history, and the server provides the issuing history through a mobile radio communication network, and if the master phone terminates the mobile-key issuing menu, the issuing history is deleted in the master phone.

Advantageous Effects

According to the present invention, since the mobile phone equipped with the SE can be used as the authentication key of the digital door lock, it is possible to enhance the convenience of using the mobile phone. Further, since security for the authentication of the digital door lock can be tightened through the server managed at a security center, it is possible to efficiently prevent a unjust user from using the SE unrighteously.

Moreover, it is possible to display the operating state of the digital door lock on a display means of the mobile phone.

DESCRIPTION OF DRAWINGS

The above and other objects, features and advantages of the present invention will become apparent from the following description of preferred embodiments given in conjunction with the accompanying drawings, in which.

BEST MODE

Hereinafter, the embodiments of the present invention will be described in detail with reference to accompanying drawings.

Figure 1:
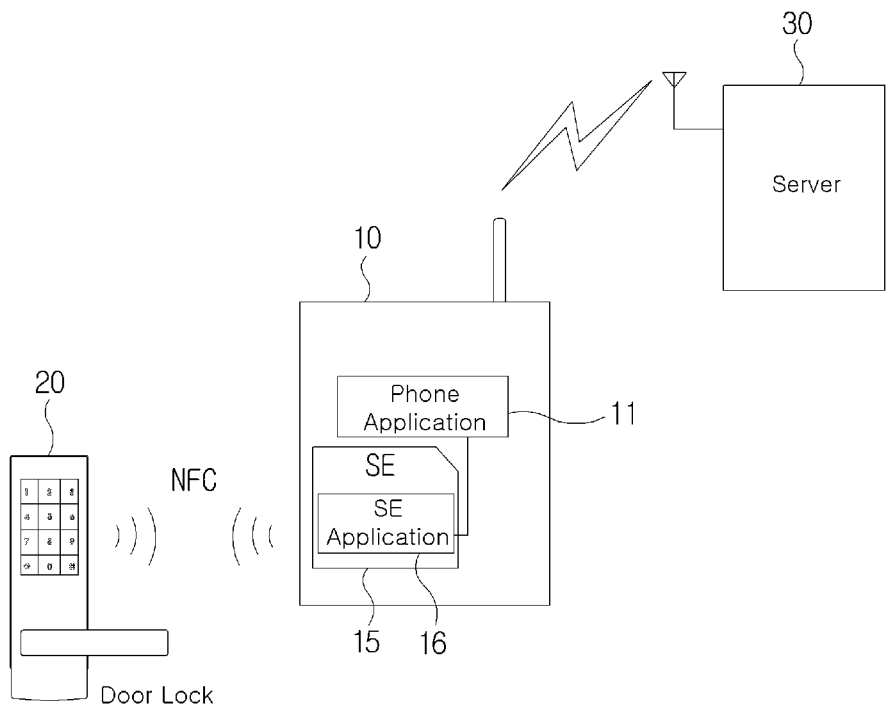
FIG. 1 is a view showing a system for providing mobile-key service according to the present invention.

FIG. 1 is a view showing a system for providing mobile-key service according to the present invention. Referring to the drawing, the system for providing mobile-key service according to the present invention includes a mobile phone 10, a door lock 20 and a server 30. Further, the mobile phone 10 is equipped with an SE (Secured Element) 15, such as a USIM card and a Micro SD card. The SE can secure the security for stored data. A phone application 11 is installed and driven at the mobile phone 10. In the same manner, an SE application 16 is installed at the SE 15 so as to control an operation of the SE 15.

The mobile-key service is to open a digital door lock 20 installed at a door of an office and a house by using the mobile phone 10. The mobile phone 10 transmits data through wireless communication to the door lock 20, and if the data transmitted to the door lock 20 includes authenticated contents, the door lock 20 is unlocked and then the door can be opened.

The mobile phone 10 can provides various utilizabilities through data transmitting of mobile radio communication network, wire/wireless Internet, infrared communication, Bluetooth, RFID communication and the like by using its input means, display means, voice output means, vibration means and the like. For example, the smart phone having an operating system is a recent general trend, various programs may be installed at the smart phone and then a certain program may be selectively run so as to carry out a desired function.

Furthermore, the mobile phone 10 provides a voice phone call function and a data transmission function by communication with a communication network base station through a mobile radio communication network. The mobile phone 10 periodically check a connection with the base station so as to check whether or not the mobile phone itself is in a call service area, and thus prepares to provide communication service through the mobile radio communication network at any time.

In order to provide the mobile-key service, the mobile phone 10 should have an NFC function such as RFID communication function, and the SE 15 is also configured to connect to the NFC function of the mobile phone 10. Due to the NFC function, the SE 15 built in the mobile phone 10 can transmit certain data stored therein to an external device (e.g., a digital door lock) through wireless communication.

Further, the phone application 11 installed in the mobile phone 10 functions to enable or disable the NFC function in order to support the mobile-key service. Meanwhile, when the NFC function is enabled, data from the SE 15 is controlled by the SE application 16, not controlled by the phone application 11, thereby communication security with the external device can be secured.

In providing the mobile-key service, the phone application 11 freely stores certain data to a memory (not shown) of the mobile phone 10 and also performs communication with a server 30 through the mobile radio communication network using the data communication function of the mobile phone 10.

Because the phone application 11 cannot directly monitor communication contents which SE is communicating with the door lock 20 through the NFC function, the phone application checks operating history of the SE 15 by periodically "polling" communication records stored in the SE 15.

The SE 15 is built in the mobile phone 10 by wiring. So the SE can directly communicates with the phone application 11, and also transmits/receives data to/from the door lock 20 through the NFC function of the mobile phone 10. Further, the SE 15 returns information of stored events as a response to the polling of the phone application 11.

In the mobile-key service according to the present invention, the mobile phone 10 is connected to the server 30 through a mobile radio communication network or a wireless internet communication network so as to download and run one or more programs (ie. application). The programs to be downloaded may be the phone application 11 and the SE application 16

Hereinafter, operations controlled by the phone application installed in the mobile phone will be described without distinguishment between by the mobile phone and by the phone application, which are called "by the mobile phone", commonly. In the same way, all operations controlled by the SE application installed in the SE will be described without distinguishment between by the SE application and by the SE, which are called "by the SE".

The door lock 20 is disposed at one side of a door so as to be locked and unlocked by operation of a user. The door lock 20 of the present invention should have a communication function, such as RFID communication function, with the NFC function of the mobile phone 10. Therefore, the door lock 20 analyzes digital information input through NFC, extracts specific information from the digital information, performs a user authentication process by comparing the extracted information with previously stored information, and controls the locking and unlocking of the door according to result of the user authentication process. Furthermore, the door lock 20 is provided with a manual input means for allowing a user to directly input characters or symbols, and thus the user authentication process can be performed by using a password of characters or symbols input by the user.

Moreover, every door lock 20 is also provided with its own unique ID, for example, a serial number assigned by a manufacturer. And if a mobile-key is input through NFC from the SE 15, the user authentication process is performed by determining whether or not certain information included in the input mobile-key is coincided with previously stored information. Herein, the previously stored information may be the unique ID of the door lock.

Further, the door lock 20 itself may generate and transmit a unique key (e.g., secret key) for encrypting data. In this case, the door lock 20 further includes a function for encrypting and decrypting data received and transmitted from/to the SE 15 through RFID communication, by using the unique key.

The server 30 communicates with the mobile phone 10 through a wireless telecommunication network using a mobile radio communication network or a wireless Internet communication network. The server 30 maintains a door lock ID and a secrete key of a registered door lock, and information of one or multiple mobile phones authenticated to the door lock 20.

If one of the mobile phones 10 requires access to the server 30, the server 30 checks whether or not there is a remaining operation to be performed with respect to the corresponding mobile phone, and then performs the remaining operations. If there is not the remaining operation, the server 30 informs only for activating of a communication linkage state.

Meanwhile, if there is the operation to be performed for the mobile phone (e.g., an operation for instructing to delete a mobile-key stored in a mobile phone), the server 30 immediately "pushes" a corresponding command to the mobile phone 10. If the command is not immediately pushed to the mobile phone 10 because the mobile phone 10 is out of a service area or the power thereof is turned off, the server 30 postpones the transmission of the command, and then retransmits later the postponed command immediately when the corresponding mobile phone is connected (ie, get into the service area).

Figure 2:
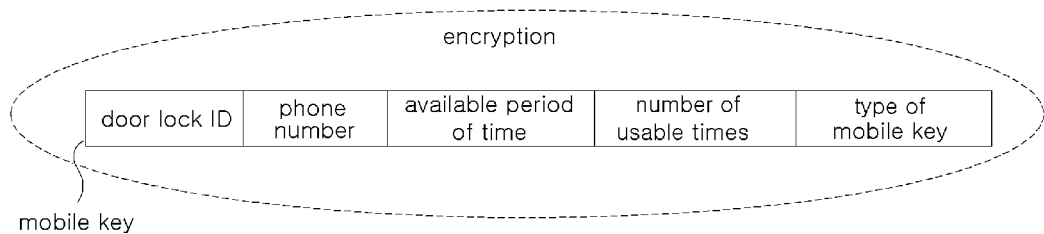
FIG. 2 is a view showing a configuration of the mobile-key for mobile-key service.

The mobile-key used in the present invention may include a door lock ID, such as a serial number or a Mac address, which is assigned by a manufacturer, a phone number of a mobile phone in which the mobile-key is stored, a period of time and/or the number of available to user authentication, and information of indicating a type of mobile-key (e.g., permanent mobile-key which can be used without limitation, one-time mobile-key which can be used only once, emergency mobile-key which can unlock a door from the outside when a forceful locking function of the door lock is preset, extendable mobile-key of which the available period of time and the number of usable times are preset, and the like) (referring to FIG. 2).

The mobile-key as described above can be encrypted by a secret key applied to, for example, a 3DES algorithm for encryption of information received and transmitted through NFC. The secret key is generated from the door lock 20 when the mobile phone 10 is initially registered in the door lock 20. The secret key may be stored in the door lock 20, the mobile phone 10 and the server 30, respectively.

If necessary, the information forming the mobile-key may be changed, and the encryption method may be selected properly.

By using the system including the above-mentioned configuration, following mobile-key service can be provided.

Figure 3:
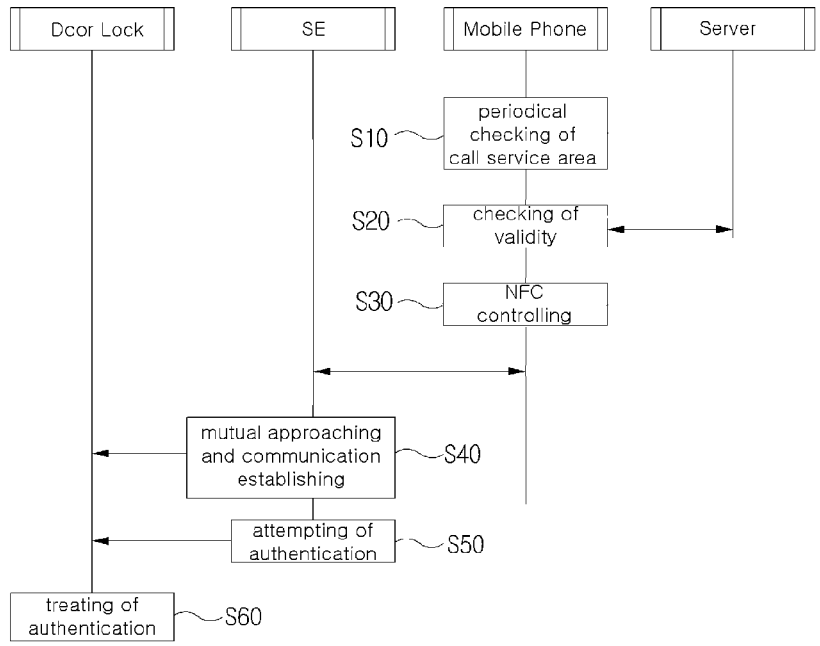
FIG. 3 is a flow chart showing a procedure for using a door lock with a mobile phone.

FIG. 3 is a flow chart showing a procedure for using a door lock with a mobile phone in the mobile-key service according to the present invention. Basically, the mobile phone periodically accesses to a base station of a mobile radio communication network and checks whether or not the communication function can be carried out, regardless of the mobile-key service. The checked communication state is temporarily recorded in a built-in buffer and the like.

Meanwhile, in the phone application, it is checked whether or not the mobile phone can receive and transmit data through the mobile radio communication network from/to the server within the present call service area (S10). This process may be carried out by that the mobile phone periodically and directly performs communication with the server. However, it is preferable to check the service area with reference to specific information indicating the communication state with a base station. In other words, although the communication state with the server is not checked directly, it could be determined that the mobile phone is able to perform communication with the server at any time if the mobile phone is within the call service area in which voice communication can be performed through the mobile radio communication network.

Meanwhile, even if the mobile phone is not within the call service area, it could be regarded as the mobile phone is within the call service area if the mobile phone is within a specific communicating available circumstance which can immediately perform communication with the server for providing the mobile-key service.

If it is determined that the mobile phone is within the call service area, the phone application enables the NFC function in order to allow the SE to perform wireless communication with an external device. However, if it is determined that the mobile phone is out of the call service area, the phone application immediately disables the NFC function to block the communication function of the SE.

Following or separated from the previous step S10, the phone application periodically controls the SE application and checks the validity of a mobile-key stored in the SE by the polling (S30).

At first, an endpoint ID stored in the phone application is compared with an endpoint ID stored in the SE. The endpoint ID is information which is uniquely assigned to a mobile phone by the server when the mobile phone is initially registered in the server. The endpoint ID is stored in the phone application and the SE at the same time. By comparing the information, it can be determined whether or not a new SE had another endpoint ID is mounted upon the mobile phone, or the SE mounted from the registration of the mobile phone is still used.

Further, it is also determined whether the available period of time and/or the number of usable times of the mobile-key stored in the SE are preset, whether the mobile-key is a one-time mobile-key, or whether the mobile-key is an object to be deleted.

Through the above-mentioned processes, if it is determined that the SE and the mobile-key stored in the SE are valid, the phone application finally allows the NFC function. If they are not valid, the NFC function is blocked.

While the controlling (i.e., checking of the call service area and the validity check by using the polling operation) is being carried out, if the mobile phone is closed to the door lock in order to attempt to open the door, the NFC function of the mobile phone responds to electromagnetic energy generated from the door lock, and thus NFC is activated between the door lock and the SE (S40). The SE transmits the stored mobile-key to the door lock so as to perform the user authentication (S50). The door lock analyzes the transmitted mobile-key and decides success or failure of the user authentication according to whether the mobile-key is coincided with previously stored information (S60). If it is determined by the success of the user authentication that the mobile phone belongs to a just user, the door lock unlocks the door, and if the user authentication is failed, the door lock maintains its locking state.

The mobile-key includes at least a door lock ID. The mobile-key stored in the mobile phone has been encrypted by a secret key. The door lock decrypts the encrypted mobile-key transmitted from the SE by its own secret key using a decryption means therein. And when the door lock ID included in the decrypted mobile-key is coincided with its own ID, it is determined that the user authentication is succeeded.

Furthermore, in the door lock, if it is determined that information transmitted from the SE is encrypted by the same secret key as that stored therein, it could be regarded that the user authentication is succeeded regardless of a type/content of transmitted information.

Further, in the door lock, if information input through a key pad and the like is decrypted by its own secret key or its own decryption algorithm and also shows a specific authenticatable value, it could be regarded that the user authentication is succeeded (this is the case that a user directly inputs a one-time password using the key pad, which will be described later).

According to the mobile-key service achieved by these steps, only when it is determined that the mobile phone is within the call service area and also the mobile-key stored in the mobile phone is valid, the user authentication is attempted with respect to the door lock.

As described above, because the mobile-key can be used only within the call service area, it is possible to secure the security of the mobile-key. For example, when a mobile-key stored in the SE of a mobile phone is an object to be deleted and then a command of deleting the mobile-key is transmitted from a server through a mobile radio communication network, if the mobile phone is turned off, the deleting command may be not transmitted to the mobile phone. In this case, the mobile-key may be remained in the mobile phone and the mobile-key to be deleted can be used illegally. However, according to the present invention, because it is always determined whether the mobile phone is within the call service area, and the user authentication can be attempted only when the mobile phone is within the call service area, the mobile phone is forced to receive the command (i.e., deleting command) from the server, and thus it could be determined that the mobile-key remained in the mobile phone is not the object to be deleted, because it is still available.

In the present invention, even when the mobile phone is out of the call service area and then enters again the call service area, or the mobile phone is turned off and then turned on, the mobile phone is immediately forced to access the server for providing the mobile-key service and then check whether an operation to be performed with respect to the stored mobile-key is preset.

Figure 4:
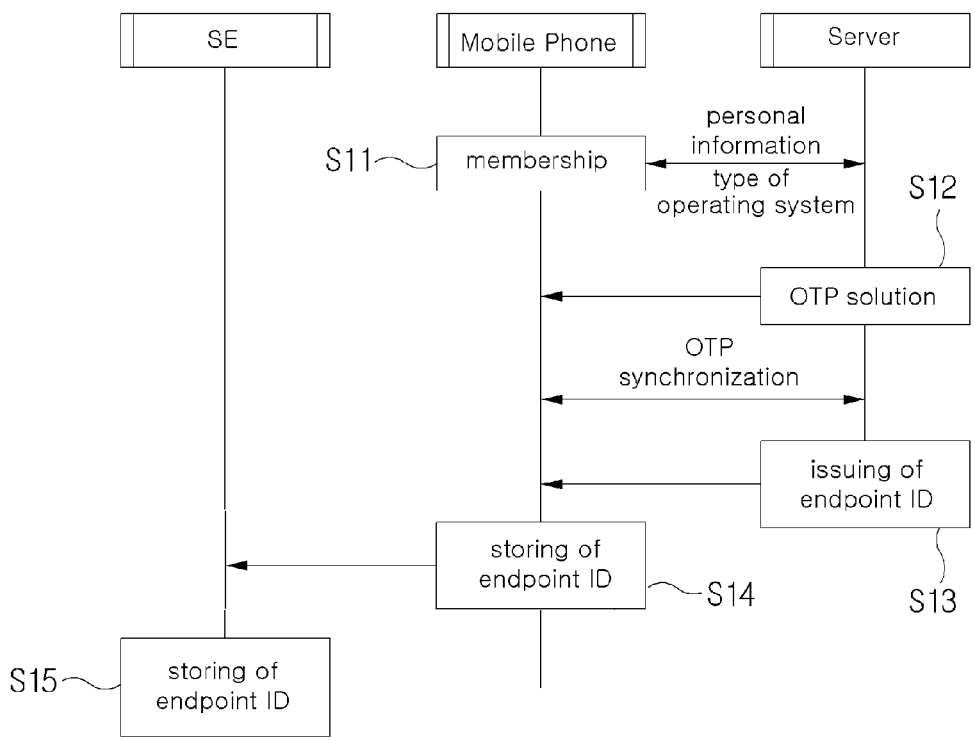
FIG. 4 is a flow chart showing a membership registration procedure for mobile-key service.

Next, in a method for providing the mobile-key service according to the present invention, a membership registration procedure for mobile-key service will be described, in which an authenticated user registers his/her own mobile phone in a server and prepares a mobile phone service. FIG. 4 is a flow chart showing the membership registration procedure for mobile-key service.

Firstly, the user connects to the server through the mobile phone and inputs a user ID, a connection password, and user's personal information in order to register as a member in the mobile-key service (S11). Herein, the mobile phone may automatically inform its own phone number and operating system to the server.

The server receives the user ID, the connection password, and the user's personal information and the like, carries out the membership registration and then provides an OTP program (OTP solution) to the user's mobile phone (S12). The OTP program provided to the mobile phone is synchronized with the OTP program of the server. Therefore, whenever the mobile phone connects to the server, OTP authentication is performed through the OTP program, thereby providing connection security.

The server assigns a unique endpoint ID to the registered mobile phone (S13). The mobile phone stores the assigned endpoint ID therein and also in the SE at the same time (S14 and S15). The endpoint ID is used later as information for determining whether the SE is still mounted in the initially registered mobile phone.

The membership registration procedure for mobile-key service has to be performed in every mobile phone which wants to use the mobile-key service according to the present invention.

Figure 5:
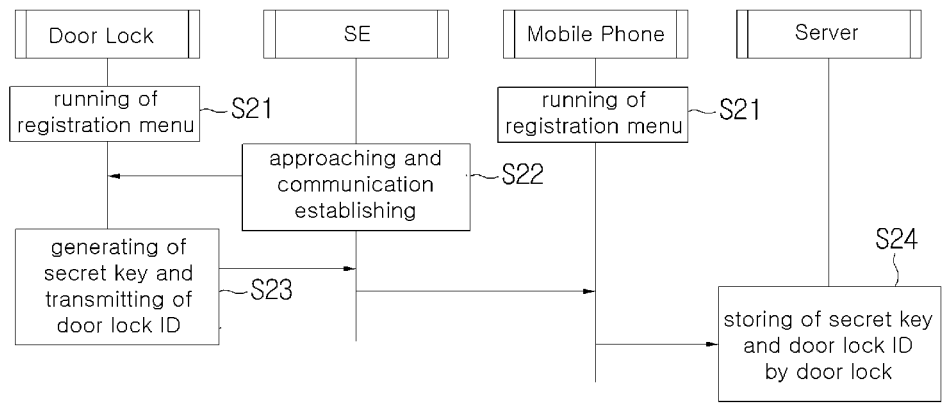
FIG. 5 is flow chart showing a procedure for registering a master phone in a door lock.

Next, a procedure for registering a mobile phone as a master phone in a door lock will be described. FIG. 5 is flow chart showing the procedure for registering a master phone in a door lock.

Firstly, a mobile phone registration menu is run in the door lock, and a door lock registration menu is also run in the mobile phone (S21). In the mobile-key service according to the present invention, one mobile phone may be registered in one door lock. The registered mobile phone may be used as a master for controlling various functions of the mobile-key service.

Then, while each registration menu is run, a user brings up the mobile phone close to the door lock, and thus NFC is established between the door lock and the mobile phone (S22).

The door lock is transmitting the door lock ID stored therein to the SE. Further, the door lock generates the secret key to be used for transmitting any data (or encrypting the mobile-key) and then transmits it to the SE (S23). The SE transmits the received door lock ID and the secret key to the mobile phone (ie, phone application) without storing them therein. The mobile phone transmits the received information to the server. The server inspects the contents of the information from the corresponding door lock, checks whether a new master phone is registered in the door lock, and then stores the transmitted information (S24). Herein, the mobile phone may transmit the information together with a name for helping a user distinguish the corresponding door lock, and the server may also store the information classified by names. The name may be designated by, for example, "my house", "dormitory", "office" and the like.

One mobile phone may be set as a master phone with respect to multiple door locks. When the user is registered in the multiple door locks, this naming function allows the user to conveniently distinguish the mobile-key of each door lock.

Meanwhile, because only one master phone can be assigned to one door lock, if the server determines that a master phone is already registered in the corresponding door lock, information of the already registered master phone may be deleted.

Next, a procedure for issuing a mobile-key in a master phone registered in a door lock will be described. The mobile-key can be issued only by using the previously registered master phone. Further, the mobile-key is not issued to the master phone by itself, when the master phone is registered as a member in the server or registered in the door lock. Therefore, the mobile-key of the master phone is also issued from the server by the mobile-key issuing procedure. The master phone can instruct the server to issue the mobile-key to a certain mobile phone. So, the master phone can select itself as the object of the mobile-key to be issued so that the master phone can be issued with the mobile-key (referring to FIG. 6).

Figure 6:
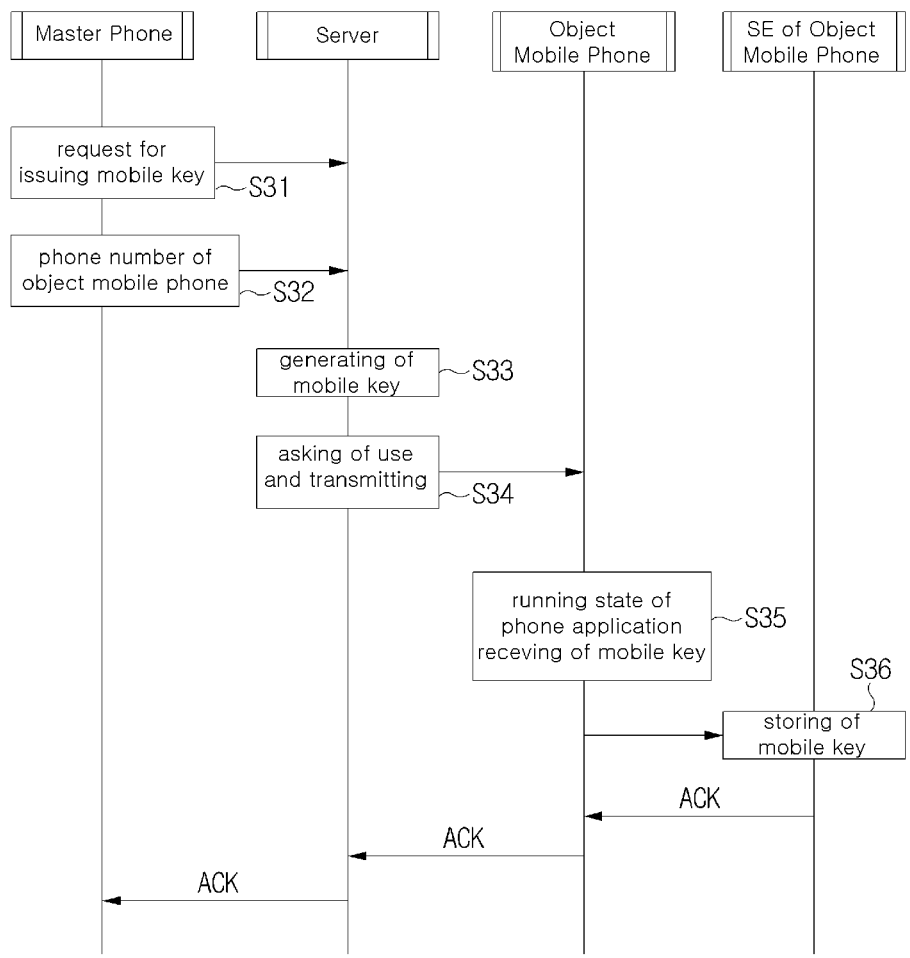
FIG. 6 is a flow chart showing a procedure for issuing a mobile-key in the master phone.

FIG. 6 is a flow chart showing the procedure for issuing a mobile-key in the master phone. First of all, the master phone accesses to the server so as to request the issuing of the mobile-key, and at the same time, inputs a phone number of a any target mobile phone to be issued with the mobile-key (S31 and S32). The server generates the mobile-key including various information such as the door lock ID and encrypts the mobile-key using the secret key (S33). At the same time, the server transmits a push message to the target mobile phone and asks whether or not the mobile phone will receive the mobile-key. This asking is to determine user's intention of whether to receive the mobile-key as well as to check whether the target mobile phone is within the call service area which can communicate with the server. Further, the target mobile phone runs the phone application when receiving the push message from the server.

If the target mobile phone approves receiving of the mobile-key, the server transmits the generated mobile-key (S34). While the phone application is run, the target mobile phone can receive the mobile-key (S35), and the received mobile-key is stored in the SE (S36). The target mobile phone informs the server that the storing of mobile-key is completed, and then the server also informs the master phone that the mobile-key is issued to the target mobile phone.

The target (or object) mobile phone storing the mobile-key can be immediately used with respect to the door lock for opening.

Next, a procedure for deleting the mobile-key issued to a certain mobile phone and thus preventing the mobile phone from being authenticated with respect to the door lock. The operation of deleting the mobile-key can be performed by only the master phone.

Since the door lock is checking the door lock ID stored in the mobile-key for authentication, the mobile-key stored in the SE of the mobile phone has to be deleted in order to limit the user authentication. Moreover, because the master phone does not directly communicate with the mobile phone to be prohibited, a command of deleting the mobile-key has to be executed through the server.

Further, it is also necessary to be considered for a case that the mobile phone does not receive the deleting command due to specific communication conditions or malicious purposes and thus the mobile-key is not deleted immediately.

Figure 7:
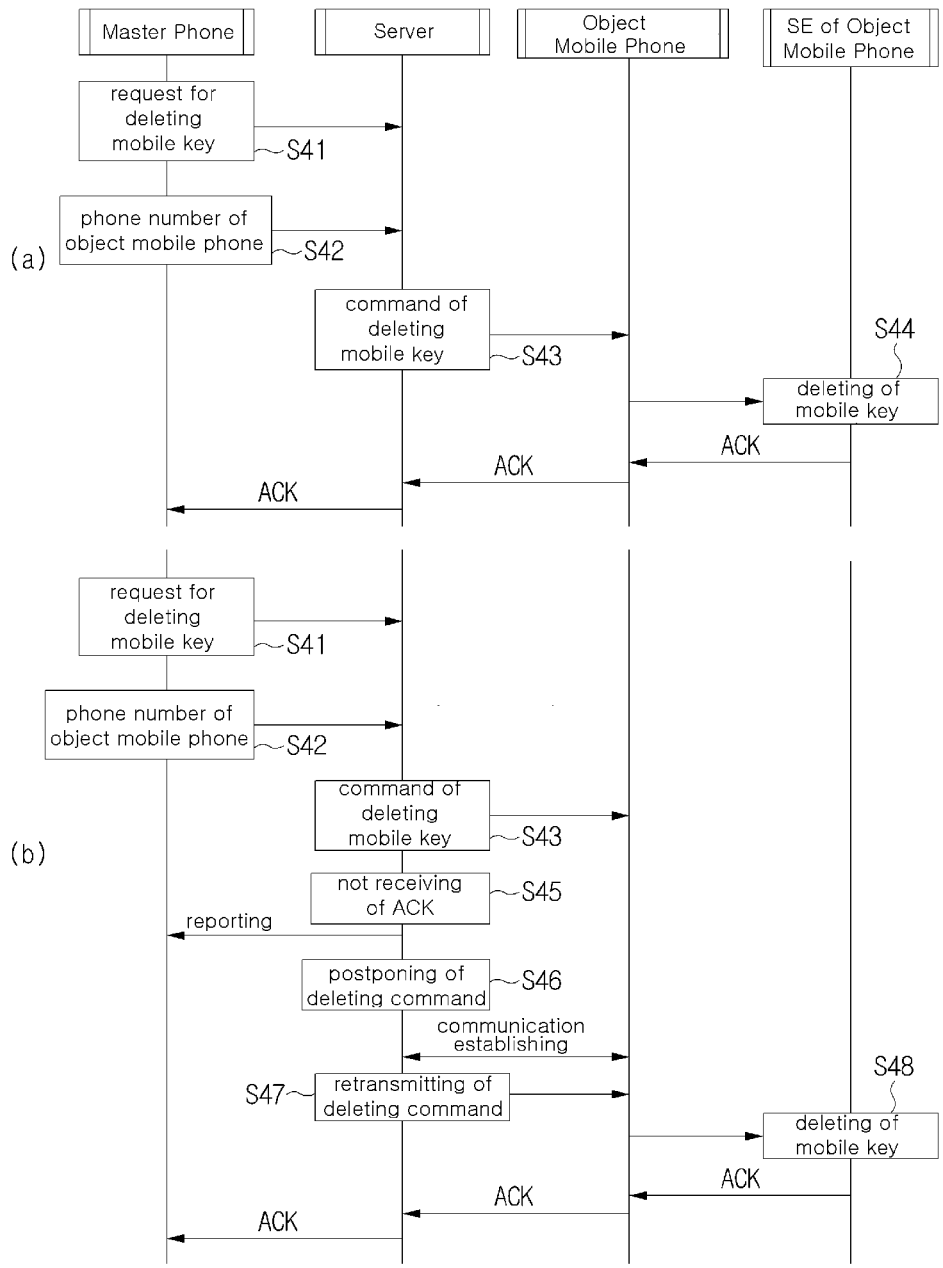
FIGS. 7A and 7B are flow charts showing a procedure for limiting use of a sub-mobile phone as the mobile-key.

A procedure for deleting the mobile-key will be described with reference to FIGS. 7A and 7B. FIG. 7A shows a normal procedure for deleting the mobile-key when the mobile phone is within the call service area so as to perform communication with the server.

The master phone transmits to the server a request for deleting the mobile-key and a phone number of an object mobile phone of which a mobile-key will be deleted (S41 and S42). The server transmits to the object mobile phone a command for immediately deleting the mobile-key stored in the SE. (S43). The object mobile phone receives the deleting command through a mobile radio communication network and then instructs the SE application to delete the stored mobile-key and related information. The SE application deletes the information (including the mobile-key) stored in the SE in response to the deleting command of the mobile phone (S44). Then, completion of the deleting operation is informed to the server and the master phone.

Meanwhile, a case that the object mobile phone cannot communicate with the server because it is out of the call service area will be described. The case that the object mobile phone cannot communicate with the server may occur, for example, when the object mobile phone is out of the call service area, communication problems are temporarily generated in the object mobile phone, the object mobile phone is turned off, an antenna of the object mobile phone is removed, the communication function of the object mobile phone has broken down, the SE is separated from the object mobile phone, the object mobile phone is in flight mode in which the communication function is stopped, or the object mobile phone is suspended.

In the mobile-key service according to the present invention, the phone application of the mobile phone periodically accesses to an operating system of the mobile phone so as to check whether the mobile phone is within the call service area, and blocks the NFC function when the mobile phone is out of the call service area. Thus, it is impossible to perform the user authentication when the mobile phone is out of the call service area. Accordingly, it is possible to manage the case that the communication function of the mobile phone is blocked with wrong purposes.

In addition, the phone application has to be run when the user authentication is attempted with respect to the door lock using the mobile-key service of the present invention, and also when the phone application is initially run, the phone application connects to the server so as to check whether there are unperformed events for the stored mobile-key. Further, when it is confirmed that the mobile phone is out of the call service area and then gets into the call service area, the phone application connects to the server immediately so as to check whether there is the events for the stored mobile-key. Therefore, at least when the user authentication is performed with respect to the door lock, the mobile phone has to be turned on so that validity of the mobile-key can be confirmed through the mobile radio communication network, and thus it is prevented that the mobile-key is used for malevolent purposes.

The mobile-key deleting procedure which can support this function will be described with reference to FIG. 7B. When the master phone transmits a request for deleting a mobile-key stored in an object mobile phone (S41 and S42), the server immediately transmits a command for deleting the mobile-key to the object mobile phone (S43).

Herein, if the object mobile phone does not receive the deleting command, and the server does not receive from the object mobile phone a message that deleting of the mobile-key is completed (S45), the server informs the master phone about failure of the deleting operation. At the same time, the server postpones the deleting command and preparing for retransmission (S46).

And then, when the object mobile phone gets into the call service area, the object mobile phone asks the server about whether there is any postponed command. The server immediately retransmits the deleting command (S47). The object mobile phone instructs the SE to delete the mobile-key according to the deleting command, and then the SE deletes the mobile-key (S48). The completion of the deleting command is informed to the server, and the server reports it to the master phone.

Hereinafter, various functions which can be provided by the mobile-key service of the present invention will be described. According to the mobile-key service of the present invention, one mobile phone can store various types of mobile-keys with respect to one or multiple door locks. Each mobile-key may be assigned with a name designated by a user of the mobile phone, and the user can distinguish the multiple mobile-keys through the names. The phone application can select one of the multiple mobile-keys by using the names. If one of the multiple mobile-keys is selected by the user, the validity of the selected mobile-key is checked by the polling so that the selected mobile-key can be used to authentication.

Figure 8:
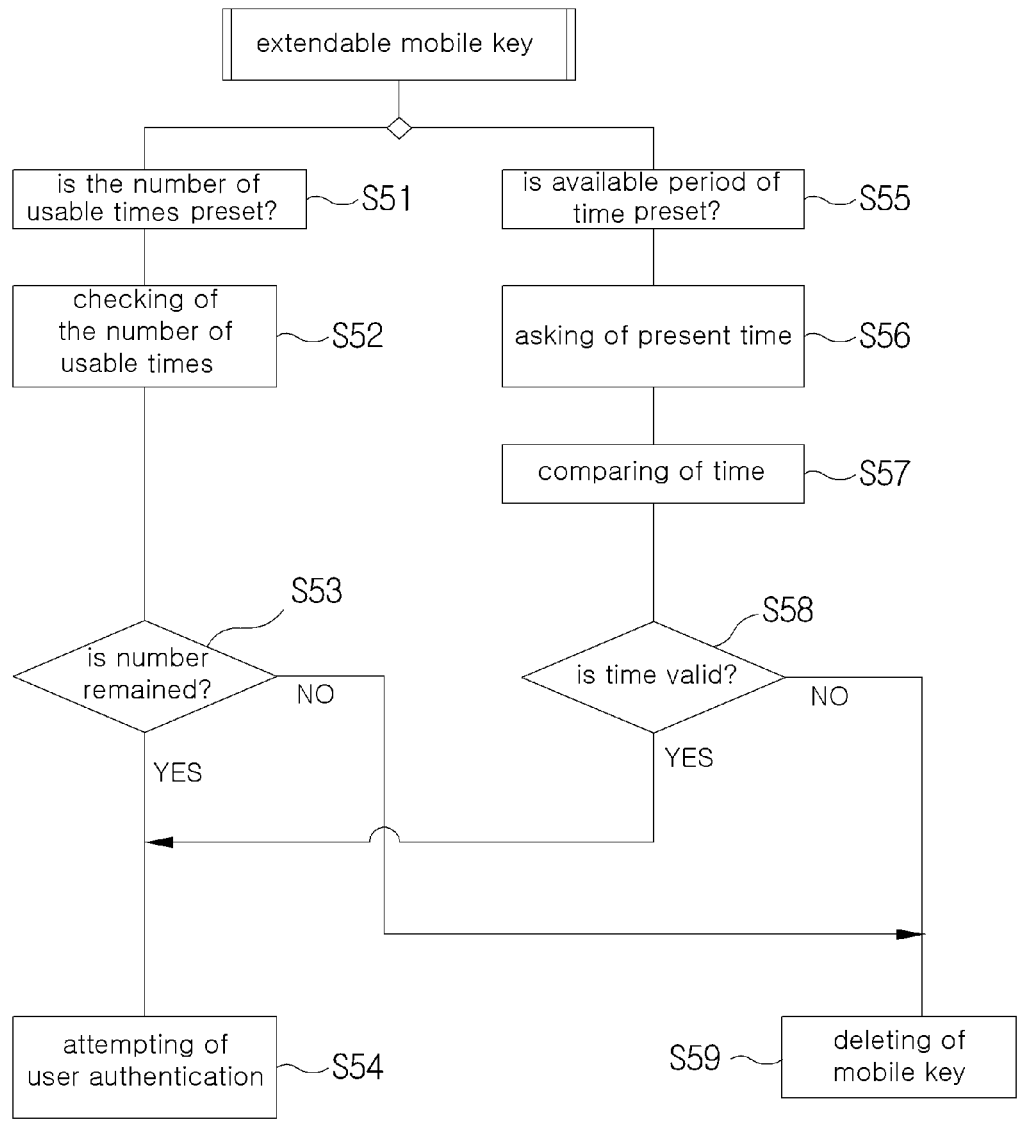
FIG. 8 is a flow chart showing a procedure for checking validity of an extendable mobile-key in the mobile-key service according to the present invention.

The mobile-key service of the present invention can provide an extendable mobile-key of which the available date and period of time and the number of usable times are preset. Upon use of the extendable mobile-key, the user authentication can be performed only when its validity is confirmed. A procedure for checking validity of an extendable mobile-key will be described with reference to FIG. 8.

The extendable mobile-key comprises, the available period of time and/or the number of usable times, and the type of mobile-key (refer to FIG. 2).

Firstly, if the extendable mobile-key stored in the mobile phone is selected by a user, the phone application checks whether the available period of time and the number of usable times of the extendable mobile-key are expired.

If the number of usable times is preset (S51), the phone application asks the SE about the number of usable times of the extendable mobile-key. Meanwhile, the SE stores the number of usable times with respect to all of the mobile-keys in a desired storing means. The phone application receives the number of usable times of the extendable mobile-key from the SE application, and then compares it with the number of usable times included in the extendable mobile-key (S52).

If the remained number of usable times is 0, the phone application disables the NFC function so as to block the attempt on the user authentication, disables the extendable mobile-key stored in the SE, or deletes the extendable mobile-key immediately (S59).

If the remained number of usable times is 1 or more, the phone application enables the extendable mobile-key so that the extendable mobile-key is used in the user authentication.

After the extendable mobile-key is used in the user authentication, the number of already-used times of the corresponding mobile-key is increased by 1 and then stored in the SE.

Alternatively, the number of usable times included in the extendable mobile-key may be automatically decreased by the phone application. Herein, if the number of usable times is 0, the phone application may control the SE to automatically delete the extendable mobile-key. In this case, since the mobile-key is deleted from the SE at the moment that the number of usable times is 0, the attempt on the user authentication is blocked fundamentally.

In the same way, the available period of time of the extendable mobile-key may be preset (S55). In this case, if the phone application periodically checks whether the mobile-key stored in the SE is an extendable mobile-key, of which the available period of time is preset, by the polling, the mobile phone asks the server about the present time (S56). Of course, the mobile phone may have its own precise watch. However, since the present time may be changed by the user, it is preferable that the mobile phone asks the server about the present time.

If the phone application receives the present time from the server, the phone application checks whether the present time is within a period of time preset in the mobile-key (S57 and S58). If the available period of time is not expired, the mobile phone determines that the mobile-key is valid, such that the user authentication can be performed (S54). If the available period of time is expired, the phone application controls the SE to delete the extendable mobile-key immediately (S59).

By the procedure for checking validity of the extendable mobile-key, the validity of the mobile-key stored in the mobile phone can be more effectively managed. For example, the master phone can set certain mobile phone so that the user authentication with respect to the door lock can be performed only the predetermined number of times or only during the predetermined period of time, and thus security for the mobile-key can be tightened.

The mobile-key service of the present invention can provide a one-time mobile-key which can be used only once. Procedures for providing, using and deleting the one-time mobile-key will be described with reference to FIGS. 9A and 9B.

Figure 9:
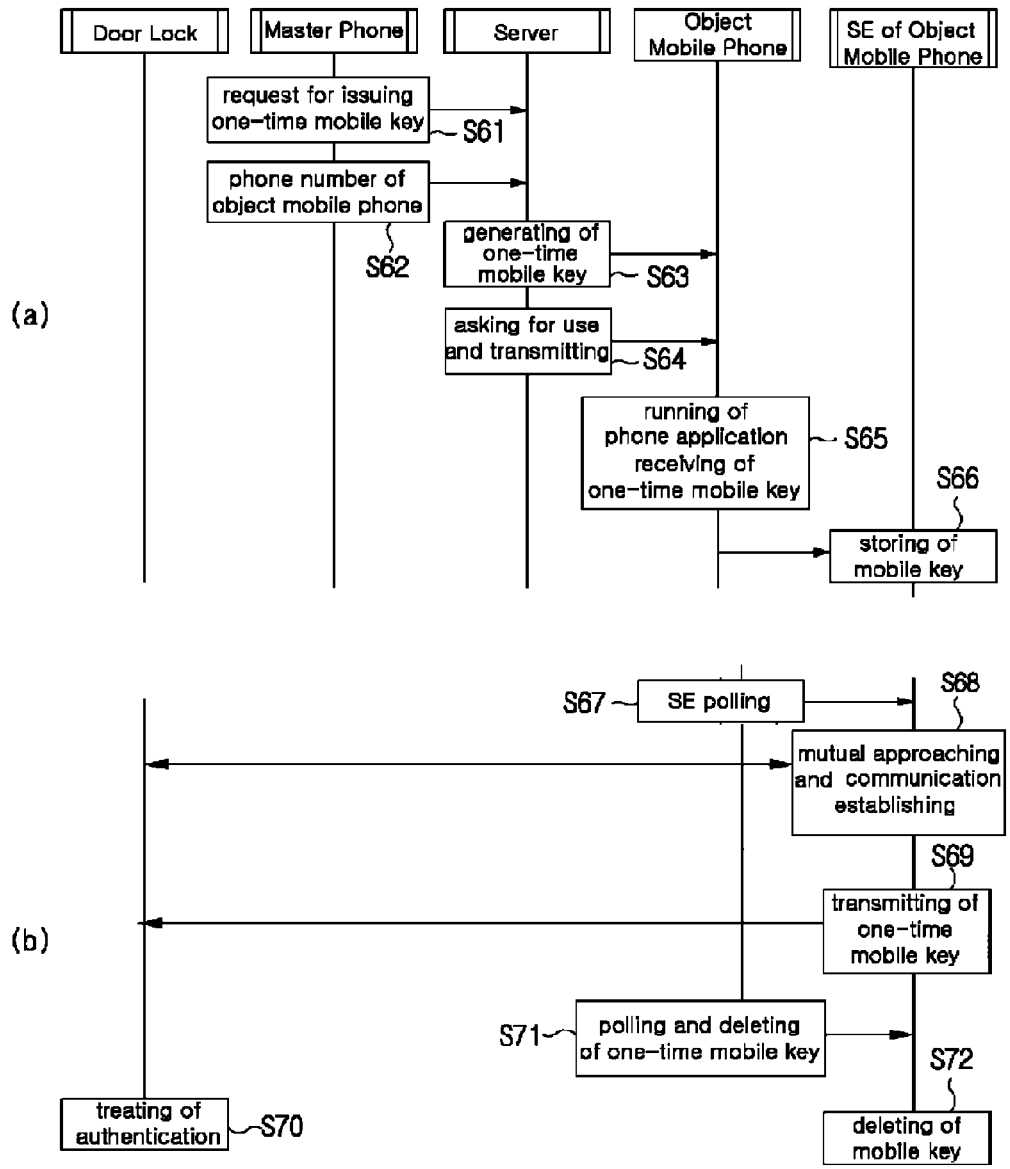
FIG. 9 is a flow chart showing procedures for creating, using and deleting a one-time mobile-key in the mobile-key service according to the present invention.

FIG. 9A shows a procedure for providing the one-time mobile-key. Firstly, the master phone transmits to the server a request for issuing the one-time mobile-key and a phone number of an object mobile phone to which the one-time mobile-key will be issued (S61 and S62). The server generates the mobile-key including a door lock ID, adds information of indicating the one-time mobile-key, and then encrypts the mobile-key using the secret key (S63). The one-time mobile-key may be formed into the extendable mobile-key of which the number of usable times is 1.

The encrypted one-time mobile-key is transmitted to the object mobile phone (S64). While the phone application is run, the object mobile phone receives the one-time mobile-key and stores it in the SE (S65 and S66).

Meanwhile, if the user selects the one-time mobile-key to use, the phone application of the object mobile phone periodically checks the number of usable times of the stored one-time mobile-key by polling the SE.

Then, if the object mobile phone having the one-time mobile-key approaches the door lock, the user authentication is performed according to the procedure of FIG. 9B. First of all, the phone application periodically checks the characteristic of the one-time mobile-key and the number of usable times of the one-time mobile-key by polling the SE (S67). If the number of usable times remains, it is regarded that the one-time mobile-key is not used yet and thus the mobile-key is maintained without deleting. If the object mobile phone having the one-time mobile-key approaches the door lock (S68), the one-time mobile-key stored in the SE is transmitted to the door lock (S69), and the user authentication is performed by using the one-time mobile-key (S70).

Meanwhile, if it is confirmed by the periodical polling that the number of usable times of the one-time mobile-key is 0 (in Step S67), the corresponding mobile-key is immediately deleted (S71 and S72).

Accordingly, the used one-time mobile-key is not remained in the SE, and thus even through the object mobile phone approaches the door lock, it is recognized that there is no mobile-key for performing the user authentication.

Figure 10:
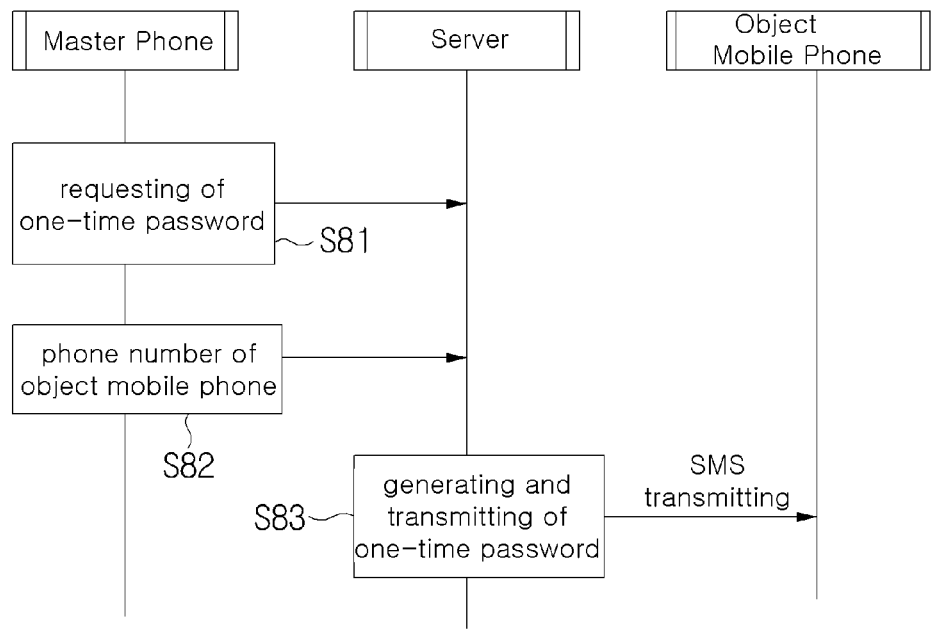
FIG. 10 is a flow chart showing a procedure for creating a one-time password in the mobile-key service according to the present invention.

Referring to FIG. 10, a procedure for providing a one-time password in the mobile-key service according to the present invention will be described. The one-time password can be used only once and is manually input through a key pad of a door lock. This procedure can be used in a case that, when certain mobile phone has not the NFC function, or has not programs (applications) provided in the mobile-key service of the present invention, the registered master phone allows a certain user to perform the user authentication only once by directly inputting the password to the door lock. In this case, the user has to possess a mobile phone which can connect to a mobile radio communication network, and the password is preferably issued through the server to the object mobile phone.

Firstly, an authenticated user (master user) connects to the server through the master phone, requests to issue a one-time password and also provides a phone number of the object mobile phone which issued with the one-time password (S81 and S82). The server generates authentication information using a door lock ID and order (number) information of a one-time password to be generated, and then encrypts it using secret key, thereby generating the one-time password is done. Because, the generated one-time password will be directly input to the door lock by the user, it is composed of multiple numerals or symbols. The generated one-time password is transmitted in the form of an SMS message to the object mobile phone (S83). The user of the object mobile phone confirms the message and then directly inputs the password to the door lock through the key pad.

If the one-time password is input, the door lock decrypts the one-time password using the secret key, and if the authentication information included in the decrypted information is coincided with information stored in the door lock (e.g., door lock IDs are coincided with each other), it is regarded that the user authentication is completed, and then the door is unlocked.

Meanwhile, the server generating the one-time password maintains the order (number) information (counter value) which indicates the issued order of the one-time password, and also the door lock maintains a counter value which indicates the number of already-used times of the one-time passwords (or the order information included in the used one-time password).

In this state, the door lock analyzes the one-time password input by the user and extracts the counter value (order information) and then performs the user authentication only when the extracted counter value is larger than the stored counter value (order information).

That is, the larger extracted counter value than the stored counter value means that the one-time password input by the user is newly generated using the recent largest counter value. Therefore, it can be prevented that the one-time password is used again.

Figure 11:
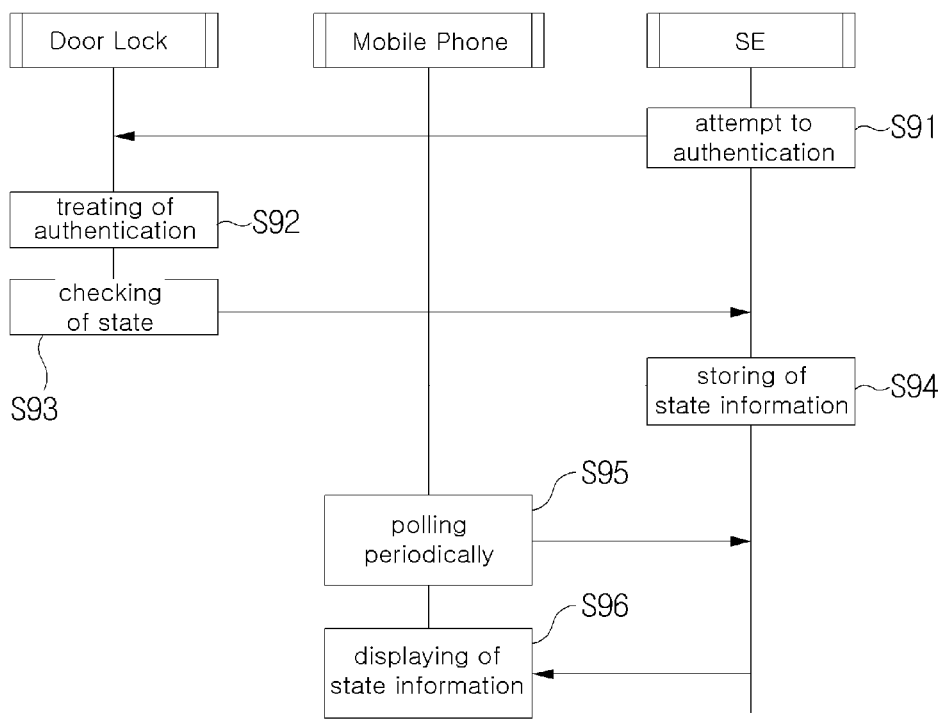
FIG. 11 is a flow chart showing a smart guide function in the mobile-key service according to the present invention.

Referring to FIG. 11, a smart guide function provided in the mobile-key service according to the present invention will be described. The smart guide function is to provide countermeasures when the mobile phone detects abnormal situation occurred in the door lock.

Firstly, if a mobile phone attempts the user authentication with respect to the door lock using the mobile-key of the SE (S91) and the user authentication is succeeded (S92), the door lock transmits information indicating its own state to the SE (S93). The SE stores the transmitted state information (S94).

Then, the phone application periodically performs the polling of the SE, and the mobile phone outputs the state information stored in the SE, thereby confirming the state of the door lock (S95). The mobile phone displays the countermeasures corresponding to the state of the door lock (S96). The user can handle the abnormal situation with reference to the displayed countermeasures.

For example, the state information of the door lock includes detection of low voltage of battery, execution of a forceful locking function of the door lock, disorder of a dead bolt and the like.

Preconditions for Embodying Mobile-Key Service

The mobile-key service of the present invention can be used only in a state that the phone application for the mobile-key service is run. Further, it can be used only when the mobile phone is within the call service area. If the mobile phone is out of the call service area, the mobile-key service is prohibited (the user authentication cannot be performed by blocking the NFC function or disabling the mobile-key). The master phone can be designated to one of users who registers as members in the server, and the mobile-key can be issued to or deleted from a certain mobile phone only through the master phone.

The server manages a security level for each door lock, and the secret key used in the 3DES algorithm is randomly generated by the door lock when the door lock is initially registered in the mobile-key service and then simultaneously stored in both of the door lock and the server. The cost of the mobile-key service may be paid by micropayment made by the mobile phone. OTP solution can be applied as a white hat hacking tool for preventing cracking into log-in information of members.

Since the mobile-key service of the present invention can be used only when the phone application and/or the SE application are run, the mobile-key service can be provided only to the users registered as members. And all of the users may connect to the server through the OTP solution.

If one of the users separates the SE registered in the door lock from the mobile phone and then mounts the separated SE in other mobile phone, the endpoint IDs stored in the separated SE and the phone application of other mobile phone are different from each other, and thus it is impossible to use the mobile-key service. In the case that the SE is newly mounted in other mobile phone, the user connects to the server and receives the endpoint ID which is previously stored with respect to the door lock so that the endpoint IDs of the SE and the phone application are coincide with each other. Alternatively, the user can delete the information previously stored in the server and then can renew the information provided from the server.

Installation of Solution for Mobile-Key Service

In order to perform the mobile-key service through a certain mobile phone, it is necessary to install and run various applications for providing the mobile-key service. The phone application functions to recognize the SE mounted in the mobile phone and also to install the SE application in the SE.

Registration in Mobile-Key Service

The user installs the phone application and the SE application in the mobile phone, connects to the server through the phone application, and then inputs a membership ID, a password and a user name in the server. Herein, the phone application of the mobile phone automatically transmits information such as a phone number and a type of operating system of the mobile phone so as to complete the membership registration procedure, and the server registers the user's mobile phone in the mobile-key service.

Then, the server transmits the OTP solution to the mobile phone to synchronize the server and the phone application. Further, the server generates the unique endpoint ID with respect to the mobile phone and then provides it to the mobile phone. The mobile phone stores the endpoint ID in a built-in memory and the SE of the mobile phone.

Execution of Mobile-Key Service Through Phone Application

If the phone application installed in the mobile phone is run by the user, the mobile-key service can be executed. A PIN code may be selectively assigned in order to manage permissions of the phone application.

If the user inputs the user ID and the password to the phone application, the phone application executes the OTP solution so as to generate an OTP authorization code, and then transmits the input ID and password and the generated OTP authorization code to the server.

Registration of Master Phone in Door Lock

A master phone registration menu is run in the door lock, and a door lock registration menu is also run in the phone application of the mobile phone to be used as the master phone, and then the mobile phone is approached to the door lock.

The door lock randomly generates the secret key, and transmits the generated secret key and a door lock ID to the approached mobile phone. The door lock receives ACK information indicating completion of reception from the mobile phone, and then stores the generated secret key, thereby completing the registration of the master phone.

The phone application transmits the secret key and the door lock ID to the server. The server checks whether the transmitted door lock ID is already registered, and then informs a result thereof to the phone application. If it is determined that the transmitted door lock ID is already registered to the server, the phone application request to select one option, whether to use the mobile-key already registered or to delete the existing mobile-keys in the server.

This case can be also applied to various cases of losing the master phone, moving house and replacing the door lock.

Issuing of Mobile-Key to a Certain Mobile Phone Through Master Phone

A menu for issuing the mobile-key to a certain mobile phone is selected in the phone application of the master phone, and a phone number of the certain mobile phone is input. If necessary, after carrying out micropayment, the phone application transmits the phone number of the certain mobile phone and requests issuing of the mobile-key. Herein, the certain mobile phone has to also install and run the phone application for providing the mobile-key service.

The server transmits a push message to the certain mobile phone and then asks whether to receive the mobile-key. If the user of the certain mobile phone agrees with the issuing of mobile-key, the operating system of the certain mobile phone can automatically run the phone application, and the phone application immediately connects to the server so as to receive the mobile-key. The phone application of the certain mobile phone instructs to store the received mobile-key in the SE through the SE application, and then informs the server about completion of the storing. The server reports it to the master phone.

Deleting of Mobile-Key of Sub-Mobile Phone

In order to delete the mobile-key issued to a sub-mobile phone (which has the mobile-key to be deleted) through the master phone, the phone application of the master phone transmits a phone number of the sub-mobile phone and a request for deleting the mobile-key to the server. The server transmits a deleting command to the sub-mobile phone. According to the deleting command, the phone application of the sub-mobile phone controls the SE application to delete the mobile-key stored in the SE, and then informs completion of the deleting to the server. The server receives a completion notice of the deleting and then informs it to the master phone.

Meanwhile, if the server does not receive the completion notice from the sub-mobile phone, the server postpones the deleting command. Then, if the communication between the sub-mobile phone and the server is performed again, the server immediately retransmits the deleting command.

Additional Functions

TABLE 1

| Category | Function | Explanation |
| --- | --- | --- |
| Mobile-key | Permanent Mobile-key | Mobile-key which can be used without limitation |
|  | One Time Mobile-key | Mobile-key which can be used only once |
|  | Extendable Mobile-key | Mobile-key of which available time, day of the week and date and the number of usable times are preset |
|  | Emergency Mobile-key | Mobile-key which can be exceptively used when a forceful locking function of the door lock is preset |
|  | One Time Password | Password which is manually input and used only once in order to support a user who does not use the mobile-key service. |
|  | Revoke Mobile-key | Deleting of mobile-key stored in the mobile phone |
|  | Mobile-key History | History of issuing and deleting the mobile-key with respect to each door lock |
| Audit | Real Time Audit | Informing of attempt of user authentication and its success/failure history to a predetermined mobile phone in the form of SMS and the like |
|  | Entire Audit | Informing of whole used history of the mobile-key by periods |
| Interaction | Smart Guide | Providing countermeasures when the mobile phone detects abnormal situation (e.g. detection of low voltage of battery, execution of a forceful locking function, and operation of a dead bolt) occurred in the door lock. |

Permanent Mobile-Key

The permanent mobile-key can be used without limitation until the mobile-key is changed by the master phone or the phone application newly registers the door lock. The permanent mobile-key can be issued only through the master phone. Further, the permanent mobile-key can be issued to a sub-mobile phone as well as the master phone.

One-Time Mobile-Key

The one-time mobile-key can be used only once with respect to a certain door lock. The one-time mobile-key can be issued only through the master phone, and also can be issued to a certain mobile phone as well as the master phone.

When the user authentication is performed using the mobile phone having the one-time mobile-key, the one-time mobile-key stored in the SE is immediately disabled or deleted.

Information indicating whether the issued one-time mobile-key is used may be provided in the SE, and thus the phone application can periodically checks whether the issued one-time mobile-key is used.

Extendable Mobile-Key

The extendable mobile-key can be issued only through the master phone, and also can be issued to a certain mobile phone as well as the master phone.

When the master phone requests the issuing of the extendable mobile-key to the server, the available period time, day of the week, and/or the number of usable times of the extendable mobile-key may be preset.

If it is determined that the mobile-key to be used is the extendable mobile-key, the mobile phone connects to the server and requests the present time so as to compare the present time with the preset available period of time. If the period of time is expired, the extendable mobile-key is disabled or immediately deleted. Otherwise, the mobile phone checks the remained number of usable times using the information stored in the SE.

Emergency Mobile-Key

The emergency mobile-key is to unlock a door from the outside when a forceful locking function of the door lock is activated. The emergency mobile-key can be issued only through the master phone, and also can be issued to the master phone. The emergency mobile-key is also configured to be used only once, like in the one-time mobile-key.

Further, the emergency mobile-key may be set to be used only when the forceful locking function is activated.

In order to release the forceful locking function of the door lock with the emergency mobile-key, the door lock has a function of recognizing the emergency mobile-key and releasing the forceful locking from the outside.

When the emergency mobile-key is issued, information indicating whether the mobile-key is used is provided in the SE, and the phone application periodically performs polling of the information so as to determine whether the emergency mobile-key is used. If the emergency mobile-key is used, the phone application immediately deletes the emergency mobile-key.

One-Time Password

The one-time password can be issued only through the master phone, and also can be issued to the master phone. If the one-time password is issued to the master phone, the user of the master phone directly informs the one-time password to other user who will use the password.

If the master phone requests that the server issues the one-time password to a certain mobile phone, the server generates a mobile-key including a door lock ID and a counter value, and encrypts the mobile-key using the secret key so as to generate a password composed of multiple numerals or symbols. The generated one-time password is transmitted in the form of an SMS message to the mobile phone.

If the user of the mobile phone directly inputs the password to the door lock, the door lock decrypts the input password using the secret key and then authenticates the decrypted password using the door lock ID and the counter value.

Since the counter value maintained in the door lock is increased, the used one-time password cannot be used again.

Mobile-Key History

If a master user wants to check a history relevant to the mobile-key service in a desired door lock (e.g., history of issuing and deleting the mobile-key), the phone application of the master phone requests the history information to the server. The server searches history information and then transmits it to the master phone. The phone application displays the transmitted history information on a display of the master phone.

If the master user checks the history and finishes the checking, the phone application deletes the displayed information.

Real Time Audit

If a mobile phone attempts to perform the user authentication with respect to a door lock, or the user authentication is succeeded or failed, the phone application can be preset to automatically report such operations to a predetermined mobile phone (e.g., master phone) by means of the SMS message.

Entire Audit

The door lock is equipped with RTC so as to store information of when, who and what operation is performed. That is, because the mobile-key includes the phone number, it is possible to know which mobile phone performs the user authentication.

The phone application of the mobile phone compensates time included in history information on the basis of time when loading of the entrance history is started and then displays it on a screen. If an Entire audit menu is selected in the phone application of the master phone, an Entire Audit mode is preset in the SE application by the phone application. And then, if the master phone approaches the door lock, the master phone receives in turn the entrance history information stored in the door lock through NFC. The door lock transmits the predetermined number of information and the information is recorded in the SE. Then, the phone application of the master phone outputs and displays the information recorded in the SE. By repeatedly performing this operation, the mobile phone can obtain the entrance history information from the door lock.

Smart Guide

If a certain mobile phone succeeds in the user authentication with respect to a door lock, the door lock transmits information indicating an internal state thereof to the SE of the mobile phone, and the SE application stores the internal state information in the SE. Then, by periodically polling the SE application, the phone application obtains the stored internal state information, and displays it and countermeasures thereof through the mobile phone so as to guide the user.

The internal state information reported by the door lock includes detection of low voltage of battery, execution of a forceful locking function of the door lock, malfunctioning of a dead bolt and the like.

Case of Losing Master Phone

Only one master phone can be registered with respect to a certain door lock. Therefore, if the master phone is lost, a user of the master phone has to directly request to delete the mobile-key stored in the lost master phone to a service provider. The service provider transmits the request to a manager of the server, and thus the mobile-key stored in the server can be deleted by the manager. At the same time, a command of deleting the mobile-key is transmitted to the lost master phone. If the lost master phone is within the call service area so as to communicate with the server, the master phone immediately deletes the mobile-key. Therefore, the master phone cannot perform the user authentication with respect to the door lock any longer. And it cannot be used as a master phone.

The master user installs the phone application for mobile-key service in a new mobile phone, and then runs the SE application so as to perform the registration procedure. Thus a new mobile-key is provided and the mobile phone can be used as a master phone. In this case, since the existing mobile-key stored in the server is still maintained, the user may receive and use the existing mobile-key.

Case of Losing Sub-Mobile Phone

In a case that a user loses his/her own mobile phone (sub-mobile phone) issued with a mobile-key through the master phone, the phone number of the lost mobile phone (sub-mobile phone) is transmitted to the server through the master phone. The server transmits a command of deleting the mobile-key to the lost mobile phone, and if a completion notice is received from the mobile phone, this procedure is finished. However, if the lost mobile phone is out of the call service area, or its power is turned off, and thus the lost mobile phone does not execute the deleting command, the server postpones the deleting command. When the lost mobile phone communicates with the server through the mobile radio communication network, the deleting command is retransmitted to the lost mobile phone so as to finish the deleting procedure.

Case of Replacing Door Lock

In a case that the door lock is replaced with a new one, it can be assumed that a main PCB of the door lock is replaced, and it is corresponded to a case that the door lock ID registered in the server and the master phone is changed. In this case, since the door lock ID forming the mobile-key is changed, whole information including the mobile-key and the secret key has to be renewed at the server, the master phone and all of the mobile phones by which the user authentication is performed with respect to the replaced door lock.

Case of Moving into a New House

The master phone can perform a procedure for registering a new door lock.

However, since the door lock might be previously registered in the server by previous resident, the server asked to the master phone whether to use the existing mobile-key or to be issued with a new mobile-key, and then performs a request of the master phone.

Case of Moving SE to Other Mobile Phone

In the mobile-key service according to the present invention, the service can be normally performed only when the SE and the phone application of the mobile phone are connected with each other. Therefore, if the SE is removed and remounted to other mobile phone which is not used upon the registration procedure, the removed SE is disabled and thus cannot be used in the mobile-key service.

In other words, the endpoint ID assigned upon the registration procedure is stored in both of the SE and the phone application. Therefore, if the SE is removed and remounted in other mobile phone, the endpoint ID stored in the remounted SE and the endpoint ID stored in the phone application of other mobile phone are different from each other. In this case, the NFC function is blocked, and thus the user authentication with respect to the door lock is prevented. Therefore, in case that the SE is moved to other mobile phone, it is necessary to register again in the server and receive a new endpoint ID, and the endpoint ID stored in the SE is also renewed.

Case that Command of Deleting Mobile-Key is not Completed

If the server does not receive the completion notice of the deleting from an object mobile phone after transmitting the deleting command to the object mobile phone, the mobile-key is remained in the object mobile phone, and the remaining mobile-key may be used in wrong purposes.

However, the phone application of the object mobile phone periodically checks whether the stored mobile-key is valid, and if the validity of the mobile-key is expired, the phone application deletes the mobile-key immediately. For example, the phone application checks every 30 seconds whether the mobile phone is within the call service area. If the mobile phone is entering within the call service area, the phone application immediately connects with the server and asks whether there is a postponed command to be performed with respect to the stored mobile-key. If there is the deleting command, the phone application deletes the mobile-key immediately.

Operation of Phone Application

If an operating system is run, the phone application enables the NFC function of the mobile phone. The mobile phone firstly connects with the server when the phone application is run, and asks whether the mobile-key stored in the SE is valid. If it is determined that the mobile-key is not valid, the mobile-key is deleted.

Further, the phone application performs polling of the SE every 30 seconds so as to check whether there is an event transmitted from the door lock to the SE. Further the phone application checks API of the mobile phone every 30 seconds so as to check whether the mobile phone is within the call service area.

Meanwhile, if the phone application is forcibly terminated by the user, the NFC function is disabled. Further, if the phone application is forcibly deleted by the user, the mobile-key stored in the SE is also deleted.

Received and Transmitted Information

When the master phone is registered in the door lock, the door lock transmits the door lock ID and the secret key to the SE of the master phone.

The door lock ID as information for the user authentication forms a part of the mobile-key, and it is assigned by a manufacturer.

The secret key is generated randomly and is used for the 3DES algorithm to encrypt communication information. The secret key is simultaneously stored in both of the door lock and the server. Further, the secret key may be stored in the SE of the mobile phone having the mobile-key.

Meanwhile, when the master phone is registered in the door lock, there is no information transmitted from the SE of the master phone to the door lock.

Further, when the door lock is registered, the phone application transmits to the server the phone number of the mobile phone (master phone), the door lock ID, the secret key, the name of the door lock designated by the user and the like.

In the user authentication procedure, the door lock transmits state information of the door lock to the SE of the mobile phone. The state information of the door lock is transmitted when the user authentication is succeeded. The state information includes detection of low voltage of battery, execution of a forceful locking function of the door lock, operation of a dead bolt and the like.

When registering a user as a member, the server transmits to the phone application of the connected mobile phone the endpoint ID for uniquely specifying the mobile phone and the OTP program for OTP synchronization.

Further, when registering as a member, the phone application transmits to the server a log-in ID, a log-in password, personal information, a phone number of the mobile phone and a type of an operating system of the mobile phone.

When the server issues the mobile-key to a certain mobile phone, the phone application of the master phone transmits to the server phone numbers of the master phone and the mobile phone which will be issued with the mobile-key, and the server transmits the generated mobile-key and the secret key to the mobile phone.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

According to the present invention, since the mobile phone equipped with the SE can be used as the authentication key of the digital door lock, it is possible to enhance the using convenience of the mobile phone. Further, since security for the authentication of the digital door lock can be tightened through the server managed at a security center, it is possible to efficiently prevent a unjust user from using the SE unrighteously.

The invention claimed is:

1. A method for mobile-key service using a mobile phone having a NFC (Near Field Communication) function and equipped with SE (Secured Element) storing a mobile-key, a door lock which performs user authentication based on the mobile-key transmitted through the NFC function, and a server which communicated with the mobile phone through a mobile radio communication network, comprising:

running the security program transmitted from the server so as to be synchronized with the server;

storing a unique Endpoint ID (Identification) in a storing means of the mobile phone and the SE, wherein the Endpoint ID is generated and transmitted by the server;

periodically checking whether the mobile phone can communicate with the server through the mobile radio communication network so that the mobile phone is within a call service area;

enabling the NFC function of the mobile phone when the mobile phone is within the call service area;

transmitting the mobile-key from the SE to the door lock through the NFC function when the mobile phone approaches the door lock; and receiving the mobile-key and locking or unlocking a door by the door lock according to a result of the user authentication using the mobile-key.

2. The method according to claim 1, wherein the mobile-key is encrypted by a secret key generated by the door lock.

3. The method according to claim 1, wherein the enabling of the NFC function of the mobile phone further comprises:

comparing the Endpoint ID stored in the storing means and the Endpoint ID stored in the SE by the mobile phone; and disabling the NFC function by the mobile phone when the Endpoint IDs are different from each other.

4. The method according to claim 1, before the processes, further comprising a process of registering a master phone, in which the door lock and the mobile phone run menus for initially registering each other, when the mobile phone approaches the door lock, the door lock generates a secret key and transmits the generated secret key and a door lock ID to the SE of the mobile phone, and the mobile phone transmits the secret key and the door lock ID to the server, and the server stores the secret key and the door lock ID.

5. The method according to claim 4, wherein the server allows only one master phone to be registered with respect to one door lock, and allows one mobile phone to be registered as the master phone with respect to multiple door locks.

6. The method according to claim 4, after the process of registering the master phone, further comprising a process of providing a mobile-key, in which the master phone transmits to the server a phone number of an object mobile phone to be authenticated in the door lock, the server generates the mobile-key and transmits the mobile-key to the object mobile phone, and the object mobile phone stores the mobile-key in the SE.

7. The method according to claim 6, wherein the mobile-keys of the master phone and the object mobile phone are encrypted by the same secret key.

8. The method according to claim 6, further comprising a process of deleting the mobile-key, in which the master phone transmits to the server a command of deleting the mobile-key and a phone number of the object mobile phone of which the mobile-key will be deleted, the server instructs the object mobile phone to delete the mobile-key, the object mobile phone deletes the mobile-key stored in the SE and then report completion of the deleting to the server, and the server informs the master phone about the completion of the deleting.

9. The method according to claim 8, wherein, in case that the server does not receive a completion notice of the deleting from the object mobile phone, the deleting command is postponed, and when the object mobile phone is connected with the server through the mobile radio communication network, the server retransmits the postponed deleting command to the object mobile phone.

10. The method according to claim 6, wherein the server stores a issuing history of the mobile-key, and the master phone runs a mobile-key issuing menu so as to request the issuing history to the server, and the server provides the issuing history through a mobile radio communication network, and when the master phone displays the issuing history and terminates the mobile-key issuing menu, the master phone deletes the issuing history.

11. The method according to claim 4, further comprising storing the number of usable times of the mobile-key in the SE when the user authentication is performed,
 wherein, in case of limiting a object mobile phone to be used only once in performing the user authentication with respect to the door lock, the master phone transmits a phone number of the object mobile phone to the server, the server generates a mobile-key of which the number of usable times is preset to 1 and then transmits the mobile-key to the mobile phone, the object mobile phone stores the mobile-key in the SE, and when the object mobile phone approaches the door lock, the SE of the object mobile phone transmits the mobile-key to the door lock so as to perform the user authentication, and then since the number of already-used times becomes equal to the usable times, the object mobile phone immediately deletes the mobile-key.

12. The method according to claim 4, wherein the door lock comprises a counter of indicating the number of already-used times of a one-time password when the one-time password is input manually to the door lock;
 wherein, the master phone transmits to the server a phone number of a object mobile phone to which the one-time password is issued, and the server generates the one-time password which has a counter value of indicating issuing order and transmits the one-time password to the object mobile phone in the form of an SMS (Short Message Service) message,
 and when a user of the object mobile phone inputs the one-time password from the SMS to the door lock, the door lock performs the user authentication only when the counter value of the inputted one-time password is larger than a counter value stored in the door lock.

13. The method according to claim 1, wherein, in the checking of whether the mobile phone is within the call service areas, when the mobile phone is out of the call service area, the mobile phone blocks the NFC function.

14. The method according to claim 1, wherein, in the enabling of the NFC function of the mobile phone, the mobile phone checks whether the mobile-key stored in the SE has an available period of time, and if the available period of time is preset, the mobile phone connects with the server periodically and asks present time, and if the present time is within the preset available period of time, the mobile-key is determined as valid, and otherwise the mobile-key is deleted.

15. The method according to claim 1, further comprising storing the number of already-used times of the mobile-key in the SE when the user authentication is performed,
 wherein, in the enabling of the NFC function of the mobile phone, the mobile phone checks whether a number of usable times of the mobile-key is preset, and if the number of usable times of the mobile-key is preset, the mobile phone requests the number of already-used times to the SE, and if the number of already-used times is less than the number of usable times, the mobile-key is determined as valid, and otherwise the mobile-key is deleted.

16. The method according to claim 1, further comprising:
 providing an OTP (One Time Password) program relating to the server to the mobile phone;
 installing the OTP program in the mobile phone and then synchronizing the OTP program with the server; and
 performing authentication using the OTP program when the mobile phone is connected with the server.

17. The method according to claim 1, further comprising a smart guide process in which the door lock transmits information indicating a state of the door lock to the SE of the mobile phone when the user authentication is succeeded, the SE stores the state information, and the mobile phone periodically performs polling to the SE so as to read the stored state information and then displays the state information.

18. The method according to claim 1, further comprising:
 storing whether the user authentication with respect to the door lock is succeeded in the SE; and
 checking whether the user authentication is succeeded by periodically polling the SE, and informing whether the user authentication is succeeded in the form of an SMS message.

19. The method according to claim 1, further comprising:
 storing in the door lock with time at least a part of information included in the mobile-key, when the user authentication is succeeded;
 controlling the SE to request transmission of the stored information from the door lock;
 requesting the information stored in the door lock by the SE; and
 obtaining the stored information from the door lock to the SE.

* * * * *

UNITED STATES PATENT AND TRADEMARK OFFICE
CERTIFICATE OF CORRECTION

PATENT NO. : 8,787,902 B2  
APPLICATION NO. : 13/665083  
DATED : July 22, 2014  
INVENTOR(S) : Kim Page 1 of 1

It is certified that error appears in the above-identified patent and that said Letters Patent is hereby corrected as shown below:

On the title page, replace the description Item "(73) Assignee: Irevo, Inc. (Seoul, KP)" on the 4$^{th}$ line with the following:

Item "(73) Assignee: Irevo, Inc. (Seoul, KR)"

Signed and Sealed this
Seventeenth Day of February, 2015

Michelle K. Lee
*Deputy Director of the United States Patent and Trademark Office*